United States Patent
Brown et al.

(10) Patent No.: US 12,064,947 B2
(45) Date of Patent: Aug. 20, 2024

(54) METHODS OF BONDING A TEXTILE

(71) Applicant: Bemis Associates, Inc., Shirley, MA (US)

(72) Inventors: Richard A. Brown, Danville, NH (US); Jared M. Ide, Somerville, MA (US); Daryl R. Johnson, Fitchburg, MA (US); Stephen A. Topper, Barre, MA (US)

(73) Assignee: Bemis Associates, Inc., Shirley, MA (US)

( * ) Notice: Subject to any disclaimer, the term of this patent is extended or adjusted under 35 U.S.C. 154(b) by 609 days.

(21) Appl. No.: 17/328,743

(22) Filed: May 24, 2021

(65) Prior Publication Data

US 2021/0283894 A1    Sep. 16, 2021

Related U.S. Application Data

(63) Continuation of application No. 16/910,987, filed on Jun. 24, 2020, now Pat. No. 11,014,347.

(Continued)

(51) Int. Cl.
*B32B 37/12* (2006.01)
*B32B 5/26* (2006.01)
(Continued)

(52) U.S. Cl.
CPC ............ *B32B 37/1207* (2013.01); *B32B 5/26* (2013.01); *B32B 7/12* (2013.01); *C09J 5/06* (2013.01);
(Continued)

(58) Field of Classification Search
CPC ......... B32B 37/1207; B32B 5/26; B32B 7/12; B32B 2250/02; B32B 2250/20; B32B 2255/02; B32B 2255/26; B32B 5/026; B32B 5/028; B32B 7/14; B32B 2262/0215; B32B 2262/0276; B32B 2262/0292; B32B 2262/062; B32B 2305/18; B32B 2307/51; B32B 2307/724; B32B 2437/00; B32B 37/1284; B32B 37/1292; C09J 5/06; C09J 167/00; C09J 175/04; C09J 177/00; C09J 2467/00; C09J 2475/00; C09J 2477/00; C09J 2203/358; C09J 5/00; C09J 175/06; C09J 2400/263; D06N 2203/061; D06N 7/0092; D06N 2203/068; D06N 2209/123;
(Continued)

(56) References Cited

U.S. PATENT DOCUMENTS 4,785,996 A   11/1988   Ziecker et al.
6,548,579 B2   4/2003   Reski et al.
(Continued)

FOREIGN PATENT DOCUMENTS

CN   103906721 A   7/2014
CN   104302199 A   1/2015
(Continued)

OTHER PUBLICATIONS

International Search Report for PCT/US2020/039382, dated Oct. 6, 2020.

*Primary Examiner* — Daniel H Lee
(74) *Attorney, Agent, or Firm* — Morse, Barnes-Brown & Pendleton, P.C.; Sean D. Detweiler, Esq.

(57) ABSTRACT

Disclosed herein are improved methods for bonding textiles using an adhesive composition.

19 Claims, 5 Drawing Sheets

Related U.S. Application Data

(60) Provisional application No. 62/867,829, filed on Jun. 27, 2019.

(51) Int. Cl.
| | |
|---|---|
| *B32B 7/12* | (2006.01) |
| *C09J 5/06* | (2006.01) |
| *C09J 167/00* | (2006.01) |
| *C09J 175/04* | (2006.01) |
| *C09J 177/00* | (2006.01) |

(52) U.S. Cl.
CPC ............ *C09J 167/00* (2013.01); *C09J 175/04* (2013.01); *C09J 177/00* (2013.01); *C09J 2467/00* (2013.01); *C09J 2475/00* (2013.01); *C09J 2477/00* (2013.01)

(58) Field of Classification Search
CPC ...... A41D 27/245; C09D 11/10; C09D 11/30; C08G 2170/80; C08G 18/4236; D06M 17/10
See application file for complete search history.

(56) References Cited

U.S. PATENT DOCUMENTS

| | | |
|---|---|---|
| 8,815,040 B1 | 8/2014 | Sloan |
| 11,014,347 B2 | 5/2021 | Brown et al. |
| 2008/0156428 A1 | 7/2008 | Janssen et al. |
| 2009/0053949 A1 | 2/2009 | Achten et al. |
| 2013/0202787 A1 | 8/2013 | Hu et al. |
| 2013/0224447 A1* | 8/2013 | Ohashi .................. D06M 11/83 |
| | | 428/196 |
| 2015/0133014 A1 | 5/2015 | Traser et al. |
| 2018/0305863 A1* | 10/2018 | Dimotakis ............ D06P 1/5285 |
| 2020/0406598 A1 | 12/2020 | Brown et al. |

FOREIGN PATENT DOCUMENTS

| | | |
|---|---|---|
| CN | 106490699 A | 3/2017 |
| EP | 1593724 A1 | 11/2005 |
| EP | 1897926 A1 | 3/2008 |
| WO | WO-2012/004603 A1 | 1/2012 |
| WO | 2013063036 A1 | 5/2013 |
| WO | 2013167250 A1 | 11/2013 |
| WO | 2018/225604 A1 | 12/2018 |

* cited by examiner

METHODS OF BONDING A TEXTILE

RELATED APPLICATIONS

This application is a continuation of U.S. application Ser. No. 16/910,987 (U.S. Pat. No. 11,014,347), filed Jun. 24, 2020, which claims priority to and the benefit of U.S. Provisional Application No. 62/867,829, filed Jun. 27, 2019, the teachings of which are incorporated herein by reference.

BACKGROUND OF THE INVENTION

Current automated liquid adhesive jetting systems used in the textile industry are generally 100% solids reactive systems. These jetting systems require special packaging, such as aluminum foil to eliminate moisture ingress, to preserve the reactivity of the system, which produces a large amount of waste. Moreover, these jetting systems require special safety and handling procedures, the ability to heat the adhesive to a high temperature (e.g., over 100° C.), and the final clean-up of the equipment is time consuming, produces hazardous waste, and may require the use of aggressive solvents. In some instances, jetting systems may be two component systems where the two components are stored separately and then mixed, such as when two components are stored separately, but combined in the jetting nozzle just prior to jetting. These two component systems exhibit certain problems, such as the hazards of having two individual components (e.g., where one might be live isocyanate), the careful matching of flow rates of the two components to the nozzle (e.g., if the flow rates of the components change, it may affect the ability of the components to cure/crosslink), the possible need for skilled operation, and difficult clean up from having two separate components.

Current preferred heat activated, non-reactive, bonding systems for textiles utilize an extruded thermoplastic polyurethane (TPU) adhesive film. Other bonding systems are also known that utilize alternative chemistries, such as olefins, polyamides, and polyesters. These processes generally produce more film than is required for bonding fabrics, as it is supplied in a continuous/solid adhesive tape or sheet from which the desired length or shape is cut. Moreover, these adhesives are often supplied on a release liner, which is typically discarded as waste. Therefore, there is an increased raw material cost, as well as an increase in waste of unused adhesive film. In addition, the continuous tape decreases breathability and flexibility in fabric that has been bonded using the tape. Moreover, the continuous film when used on a fabric seam may adversely affect the mechanical and physical properties of the garment (so-called recovery), while the use of spaced adhesive dots to create the bond will allow the underlying textile to maintain its physical properties. There is a need for a cost effective, environmentally safe adhesive that produces a strong bond and maintains the features of the fabric the adhesive is applied to, along with an improved process for implementation of an adhesive to bond, e.g., textiles, together.

SUMMARY OF THE INVENTION

Disclosed herein are methods of bonding a textile (e.g., textile fabric) that exhibit various improvements over current methods. The disclosed methods utilize an improved adhesive composition which produces a strong bond between two pieces of fabric, while allowing the fabric to maintain flexibility and breathability. In addition, the adhesive may be jetted on a piece of fabric as adhesive dots, and the fabric pieces, which carry adhesive dots on one surface in a manner akin to "tacking" of an adhesive film, may be set aside for storage or transport prior to the bonding process being completed. The adhesive dots on the surface of the fabric are not sticky or tacky, but instead are fully dried. This provides numerous additional benefits, including reducing waste, and allowing the bonding process to be broken down into individual steps (e.g., preparing/cutting fabric, applying adhesive, storing/shipping fabric with applied adhesive, and completing the bonding process).

Disclosed herein are methods of bonding a textile. The methods comprise jetting an adhesive composition onto a first textile; drying the jetted adhesive composition on the first textile; and bonding the first textile to a second textile.

In some embodiments, the adhesive composition is jetted using a liquid jetting system (e.g., a piezo-electric liquid jetting system). In some embodiments, the jetting of the adhesive composition comprises a jetting cycle. The jetting cycle may occur for a period of about 15 ms. In some embodiments, the jetting cycle comprises at least three stages (e.g., a valve open stage, a pulse stage, and a valve close stage). In some embodiments, the valve open stage occurs for a period of about 0.25 ms to about 0.3 ms. In some embodiments, the pulse stage occurs for a period of about 0.7 ms to about 1.5 ms. In some embodiments, the valve close stage occurs for about a period of about 0.15 to about 0.8 ms. In some embodiments, the jetting cycle comprises applying pressure to a fluid delivery device to expel the adhesive composition. In some embodiments, the pressure is air pressure of about 80 psi.

In some embodiments, the jetted adhesive composition is dried at ambient temperature. In some embodiments, the jetted adhesive composition is dried for at least 8 minutes, at least 10 minutes, or at least 12 minutes. In some embodiments, the jetted adhesive composition is dried using force drying. In some embodiments, the jetted adhesive composition is dried for at least 1 minute, at least 3 minutes, or at least 5 minutes.

In some embodiments, the first textile is a fabric textile. In some embodiments, the first textile is selected from the group consisting of a cotton fabric, a polyester fabric, a stretch knit fabric, a mesh fabric, a spandex fabric, and an elastane fabric. In some embodiments, the first textile is a blend of two or more fabrics. In some embodiments, the second textile is a fabric textile. In some embodiments, the second textile is selected from the group consisting of a cotton fabric, a mesh fabric, a polyester fabric, a stretch knit fabric, a spandex fabric, and an elastane fabric. In some embodiments, the first textile and the second textile are the same material.

In some embodiments, the first textile and the second textile are bonded using hot melt adhesive bonding. In some embodiments, the first textile and the second textile are bonded at least one hour, at least twenty-four hours, at least forty-eight hours, at least one week, at least one month, or at least one year after the adhesive composition is jetted.

In some embodiments, the adhesive composition is jetted on the first textile as one or more dots. In some embodiments, the jetted dot of adhesive composition has a diameter of 0 mm to 5 mm or 0.5 mm to 2.5 mm.

In some embodiments, the first textile having the jetted adhesive composition is transferred to a second location prior to bonding with the second textile.

In some embodiments, the adhesive composition comprises an aqueous polymer dispersion; a dispersed polymer powder, wherein the polymer powder has a particle size of about 0 microns to about 250 microns; a dispersing agent;

and a thickener. In some embodiments, the adhesive composition has a viscosity within the range of 8000 cps to 12000 cps. In some embodiments, the adhesive composition has a solids content of about 15 wt % to about 20 wt %.

In some embodiments, the adhesive composition is produced by a method comprising adding one or more liquid components to a mixing vessel, wherein the one or more liquid components include an aqueous polymer dispersion, water, and a dispersing agent; mixing the liquid components in the mixing vessel at a sufficient speed to create a vortex; adding a polymer powder to the mixed liquid components to form an adhesive composition; and adding a thickener to the adhesive composition.

In some embodiments, the bonded first textile and second textile exhibit a bonded strength of about 1 lb/inch to about 8 lb/inch.

Also disclosed herein are methods of manufacturing a textile having an adhesive composition. The methods comprise jetting an adhesive composition onto a first textile; and drying the jetted adhesive composition on the first textile.

Disclosed herein are methods of bonding a textile. The methods comprise manufacturing an adhesive composition comprising: adding one or more liquid components to a mixing vessel, wherein the one or more liquid components include an aqueous polymer dispersion, water, and a dispersing agent; mixing the liquid components in the mixing vessel at a sufficient speed to create a vortex; adding a polymer powder to the mixed liquid components to form an adhesive composition; and adding a thickener to the adhesive composition; jetting the manufactured adhesive composition onto a first textile; drying the jetted adhesive composition on the first textile; and bonding the first textile to a second textile.

DETAILED DESCRIPTION OF THE INVENTION

Figure 1:
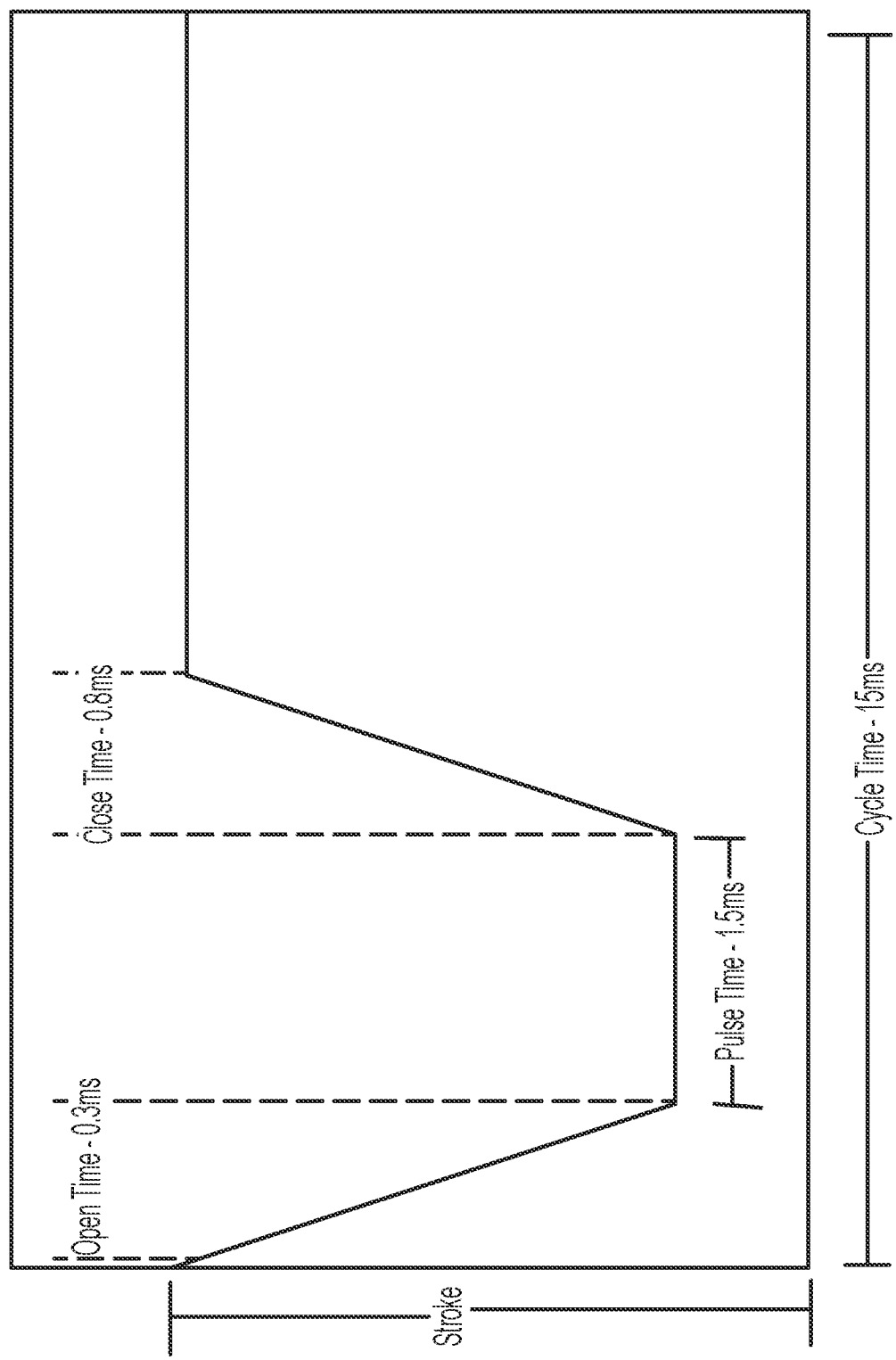
FIG. 1 provides an example of the cycle time of the jetting cycle.
Figure 2:
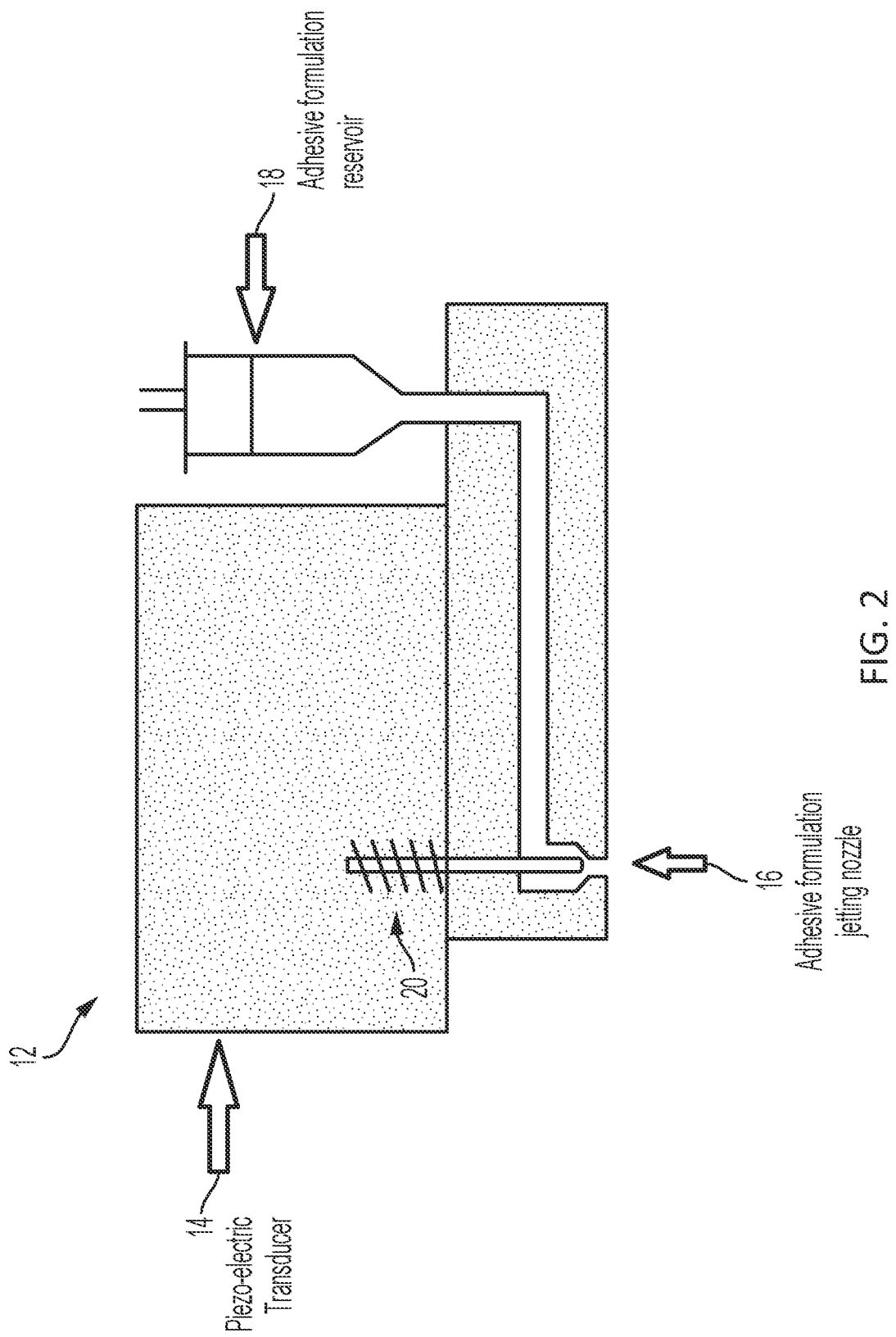
FIG. 2 provides a schematic of a piezo-electric adhesive jetting assembly.
Figure 3:
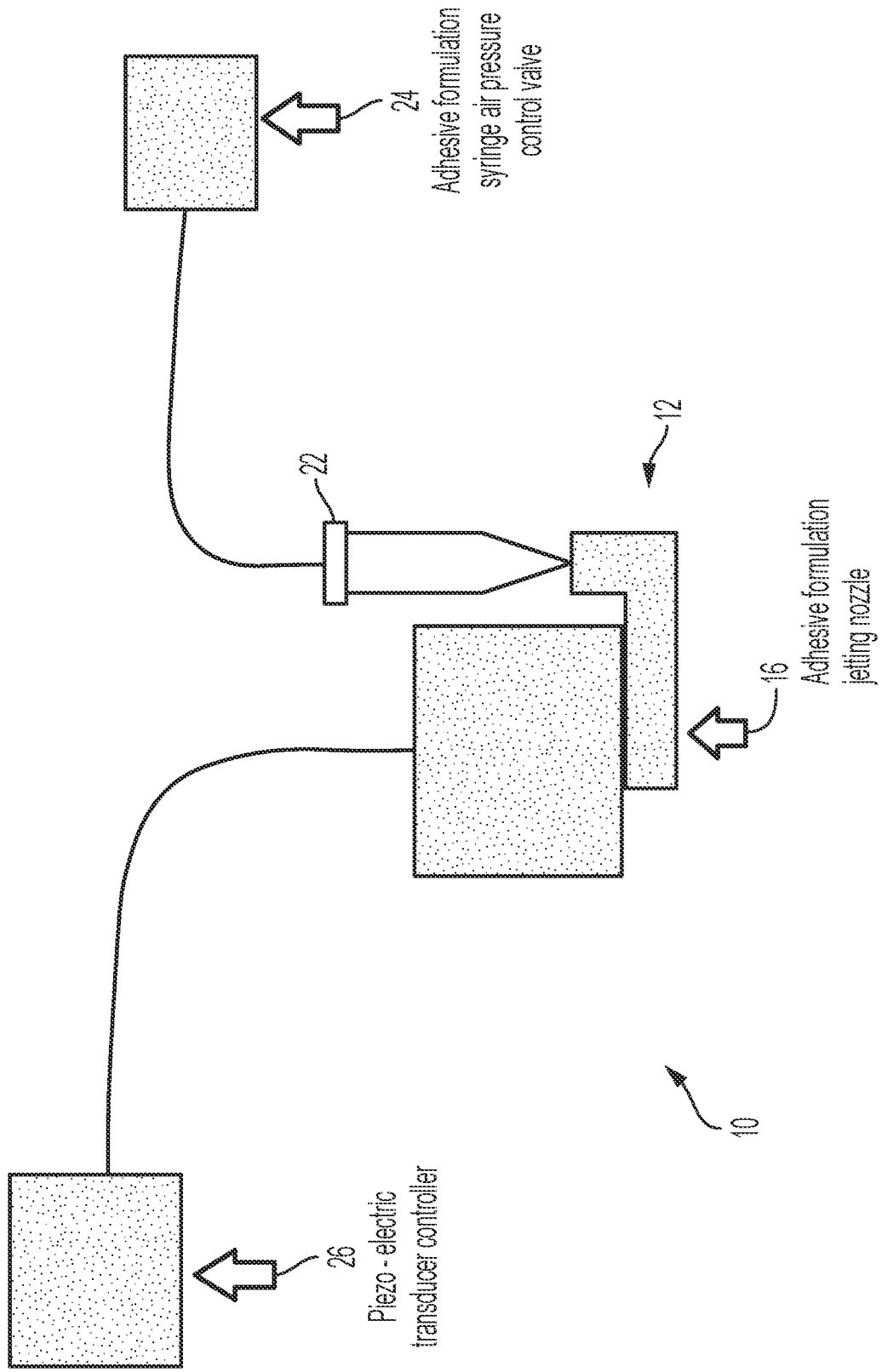
FIG. 3 provides a schematic of an adhesive jetting nozzle assembly.
Figure 4:
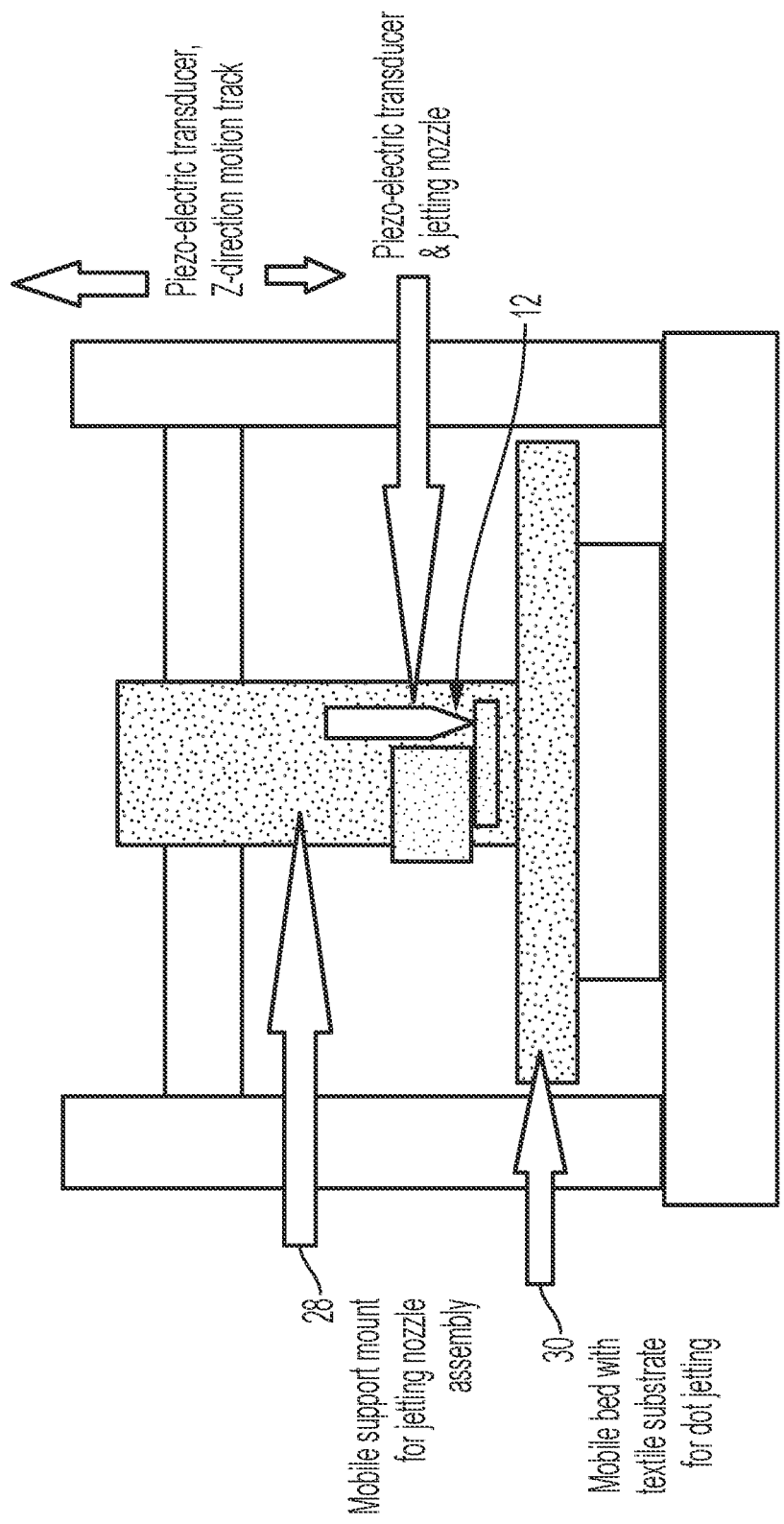
FIG. 4 provides a schematic of a front view of an adhesive jetting apparatus.
Figure 5:
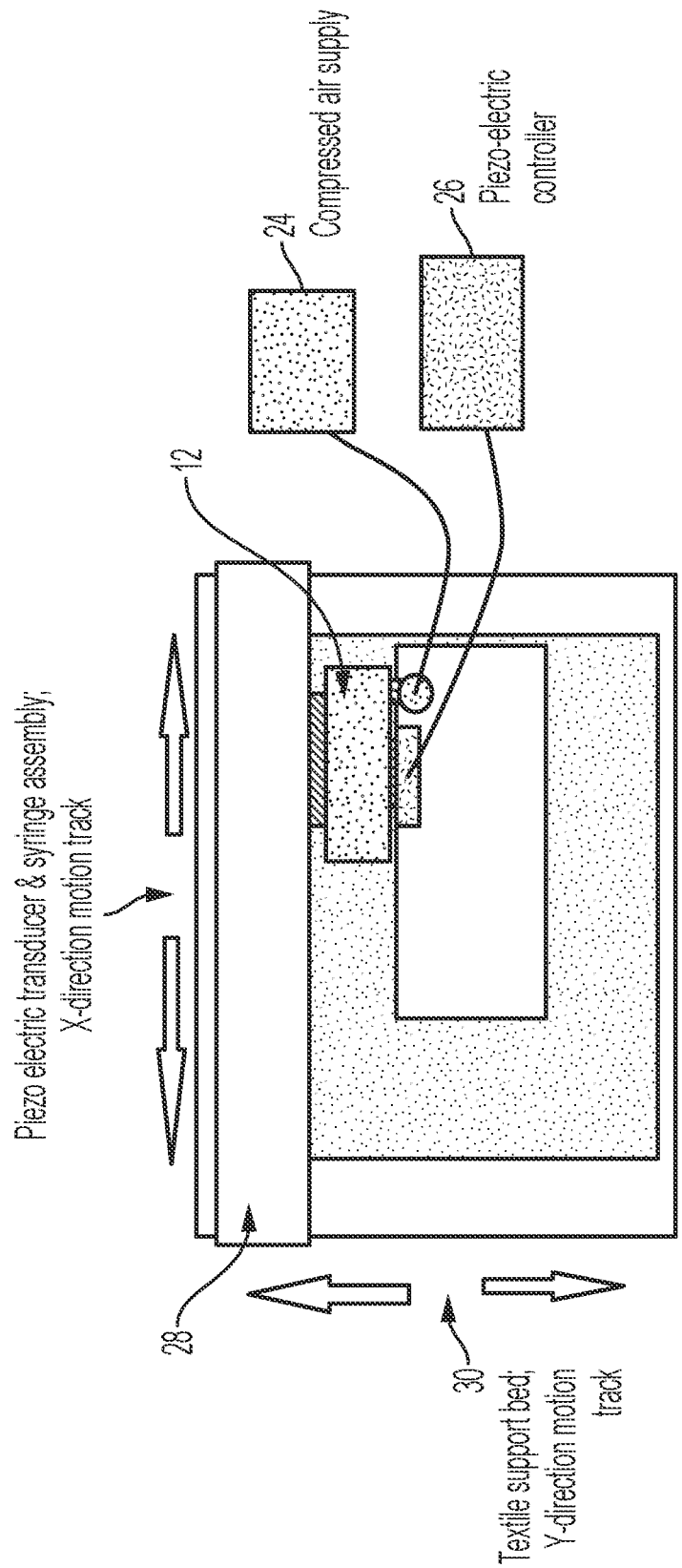
FIG. 5 provides a schematic of an aerial view of an adhesive jetting apparatus.

Disclosed herein are methods of bonding a textile (e.g., textile fabric) that exhibit various improvements over current methods. The disclosed methods utilize an improved adhesive composition which produces a strong bond between two pieces of fabric, while allowing the fabric to maintain flexibility and breathability. The manufacturing process allows for storing a textile bearing dried adhesive dots for an extended period of time prior to bonding the first and second textile.

Aspects of the invention are directed to methods of bonding a textile (e.g., a textile fabric). In some embodiments, the methods comprise jetting an adhesive composition onto a first textile; drying the jetted adhesive composition on the first textile; and bonding the first textile to a second textile.

A liquid jetting system 10 may be used to jet an adhesive composition onto a first substrate (e.g., a textile). In some embodiments, the liquid jetting system is a piezo-electric liquid jetting system (e.g., Nordson EFD Piezo Actuator Pico Pulse HD or a Superior Jet system from Marco), a pneumatic pump system (e.g., NCM5000 from GPD Global), or a diaphragm jetting system (e.g., HV-2000 from Graco Advanjet).

The liquid jetting system 10 may include a jetting head 12, which may comprise multiple components. For example, the jetting head 12 may include a transducer or actuator 14 (e.g., a piezo-electric transducer), a nozzle 16, and/or a formulation container or reservoir 18. In some embodiments, the liquid jetting system 10 includes one or more jetting heads. In some embodiments, the liquid jetting system 10 includes two or more jetting heads.

In some embodiments, the liquid jetting system 10 includes one or more transducers or actuators 14. In some embodiments, the transducer or actuator 14 functions as a valve with the nozzle 16. In some aspects, the transducer or actuator 14 includes a tappet 20 (e.g., a ceramic ball mounted on the end of a rod). The tappet 20 may be a spring loaded arm. In some embodiments, the tappet 20 is in a closed position, thereby blocking or closing an opening to the nozzle 16. In other embodiments, the tappet 20 is in an open position, thereby unblocking or opening an opening to the nozzle 16. In some aspects, to close the nozzle 16, the tappet 20 is pushed down. In some aspects, to open the nozzle 16, the tappet 20 is pulled up.

In some embodiments, the liquid jetting system 10 includes one or more nozzles 16. In some embodiments, the nozzle 16 of the liquid jetting system 10 is sized at 50 microns to 600 microns, 100 microns to 500 microns, 200 microns to 400 microns, or 250 microns to 350 microns. In some embodiments, the nozzle 16 is a 300 micron nozzle. In some aspects, the nozzle 16 is heated, e.g., to a temperature between 45° C. to 55° C. The nozzle 16 may be any nozzle design that supports jetting a particulate dispersed system (e.g., the described adhesive composition).

In some embodiments, the liquid jetting system 10 includes one or more adhesive formulation reservoirs 18. In some embodiments, the adhesive formulation reservoir 18 is connected to the nozzle 16. The adhesive composition may be stored in the adhesive formulation reservoir 18 until ready for use. In some embodiments, a fluid delivery system 22 delivers an adhesive composition to the adhesive formulation reservoir 18. In some aspects, the fluid delivery system 22 attaches to the adhesive formulation reservoir 18. In some aspects, the fluid delivery system 22 attaches to the nozzle 16 directly (e.g., by being screwed onto the nozzle). In some aspects, the fluid delivery system 22 attaches to a hose connecting the fluid delivery system 22 to the nozzle 16. The fluid delivery system 22 may be attached to an inlet port of the nozzle 16. In some aspects, the fluid delivery system 22 is a syringe, pressurized canister, or any other suitable delivery vessel. In some embodiments, the fluid delivery system 22 is a syringe. A syringe may be a 10 cc to 300 cc, 15 cc to 200 cc, 20 cc to 100 cc, or 25 cc to 50 cc syringe. In some embodiments, the syringe is a 30 cc syringe.

In some embodiments, the jetting head 12 further includes one or more cameras. The camera may be used to guide the jetting process. For example, if a textile becomes misaligned with the liquid jetting system, the liquid jetting system will correct itself to realign the jetting of the adhesive composition with the textile.

In some embodiments, the liquid jetting system 10 includes one or more control valves 24 (e.g., an air pressure control valve). The control valve 24 may control the air pressure applied to the fluid delivery system 22. In some aspects, the control valve 24 controls pumping the adhesive composition from the fluid delivery system 22.

In some embodiments, the liquid jetting system 10 includes one or more controllers 26 (e.g., a Pico Touch controller). A controller 26 may provide control of the transducer or actuator 14. In some aspects, the controller 26 directs the opening and closing of the valve by the transducer or actuator 14. For example, the controller 26 may direct the length of time the valve is open and/or the length of time the valve is closed. In some aspects, the controller 26 directs the temperature of the nozzle 16. In some aspects, the controller 26 directs the distance the tappet 20 moves as it is withdrawn into an open position.

In some embodiments, the liquid jetting system 10 is secured to a support mount 28. In some aspects, the support mount 28 is mobile (e.g., can move from side to side (i.e., X-direction), front to back (i.e., Y-direction), and/or up and down (i.e., Z-direction)). In some aspects, the liquid jetting system 10 is secured to a mobile support mount 28 and can be moved side to side, front to back, and/or up and down. In some aspects, the liquid jetting system 10 jets the adhesive composition onto a substrate support bed 30 (e.g., a textile support bed). In some aspects, the textile support bed 30 is fixed. In some aspects, the textile support bed 30 is mobile (e.g., can move from side to side (i.e., X-direction), front to back (i.e., Y-direction), and/or up and down (i.e., Z-direction)). In certain embodiments, the liquid jetting system 10 is secured to a mobile support mount 28 that can move from side to side and up and down, and jets material onto a mobile substrate support bed 30 that can move front to back. In some embodiments, the jetting head 12 of the liquid jetting system 10 is lowered to a height of about 1 cm from the surface of a textile and the adhesive composition is jetted. In some embodiments, the liquid jetting system 10 jets the adhesive composition onto a three-dimensional object.

In some embodiments, the jetting of the adhesive composition comprises a jetting cycle. In some aspects, the jetting cycle includes transferring the adhesive composition from the fluid delivery system 22 and through the nozzle 16 to jet a desired amount of adhesive composition onto a first substrate (e.g., a first textile). The jetting cycle may comprise one or more stages. For example, the jetting cycle may comprise three stages, valve open (stage 1), pulse (stage 2), and valve close (stage 3). In some aspects, the opening and closing of the valve is directed by the transducer or actuator 14. The opening of the valve includes having the tappet 20 pull back from the opening of the nozzle 16, which allows air pressure behind the adhesive composition in the fluid delivery system 22 to begin pushing the adhesive out through the valve. Once the valve is fully in the open position a pulse is applied, which causes the adhesive composition to begin to flow out of the nozzle 16. At the conclusion of the pulse stage the tappet 20 is pushed to a closed position, which causes the valve to close and jettison the material from inside the nozzle 16.

The size and volume of the jetted adhesive composition may be controlled by one or more of air pressure, stroke percentage, open time, pulse time, and close time. In some aspects, the valve open time will determine the volume of adhesive composition to pass and be jetted from the nozzle, while the valve close time, in combination with the speed of the motor moving the jetting assembly, will determine how far separated the jetted dots will be on the textile.

In some embodiments, the jetting cycle has a set cycle time. In some aspects, the set cycle time is about 2 ms to about 999 ms, about 3 ms to about 899 ms, about 4 ms to about 799 ms, about 5 ms to about 699 ms, about 6 ms to about 599 ms, about 6 ms to about 499 ms, about 7 ms to about 399 ms, about 8 ms to about 299 ms, about 9 ms to about 199 ms, about 10 ms to about 99 ms, about 11 ms to about 79 ms, about 12 ms to about 59 ms, about 13 ms to about 39 ms, or about 14 ms to about 19 ms. In some embodiments, the set cycle time is about 15.00 ms. The three stages of the jetting cycle may be completed before the set cycle time expires. In some aspects, the open time of the valve open stage is about 0.25 ms to about 0.5 ms, or about 0.25 to about 0.3 ms. In some embodiments, the open time is about 0.3 ms. In some aspects, the pulse time of the pulse stage is about 0.27 ms to about 900 ms, about 0.3 ms to about 800 ms, about 0.35 ms to about 700 ms, about 0.40 ms to about 600 ms, about 0.45 ms to about 500 ms, about 0.5 ms to about 400 ms, about 0.55 ms to about 300 ms, about 0.6 ms to about 200 ms, about 0.65 ms to about 100 ms, about 0.7 ms to about 50 ms, about 0.7 to about 25 ms, about 0.7 to about 5 ms, or about 0.7 to about 1.5 ms. In some embodiments, the pulse time is about 1.5 ms. In some aspects, the close time of the valve close stage is about 0.15 ms to about 2.0 ms, about 0.15 ms to about 1.5 ms, about 0.15 ms to about 1.0 ms, about 0.15 ms to about 1 ms, or about 0.15 ms to about 0.8 ms. In some embodiments, the close time is about 0.8 ms. In certain embodiments, the set cycle time is 15.00 ms, the open time is about 0.3 ms, the pulse time is about 1.5 ms, and the close time is about 0.8 ms.

In some embodiments, the adhesive composition is pushed through a valve by air pressure or pump during the jetting process. In some embodiments, the air pressure is about 0 psi to about 100 psi, about 10 psi to about 95 psi, about 20 psi to about 90 psi, about 30 psi to about 85 psi, or about 40 psi to about 80 psi. In some embodiments, about 80 psi of air pressure is applied to the fluid delivery device (e.g., a syringe) to push or expel the adhesive composition through the valve. In some embodiments, the air pressure is about 0 bar to 7 bar, about 0.5 bar to about 6.5 bar, about 1 bar to about 6 bar, about 1.5 bar to about 5.5 bar, or about 2 bar to about 5 bar.

During the valve open stage the tappet that is located within the fluid body assembly is pulled back from the opening of the nozzle allowing the adhesive composition to begin moving through the valve. The tappet is then returned to a closed position during the valve close stage. In some aspects, the tappet stroke (i.e., the travel distance of the tappet) is about 20% to about 90%, about 30% to about 90%, about 40% to about 90%, about 50% to about 90%, about 60% to about 90%, about 70% to about 90%, or about 80% to about 90%. In some embodiments, the tappet stroke is 90%. In some aspects, the close volts (i.e., the power of the tappet stroke as it returns to the closed position) is about 20 volts to about 120 volts, about 40 volts to about 120 volts, about 60 volts to about 120 volts, about 80 volts to about 120 volts, or about 100 volts to about 120 volts. In some embodiments, the close volts is about 120 volts. The higher the voltage, the harder the adhesive composition will be hit and thereby jettisoned from the nozzle.

In some embodiments, the nozzle is maintained at a pre-defined temperature during the jetting process. In some embodiments, the nozzle has a temperature of about 10° C. to about 100° C., about 15° C. to about 90° C., about 20° C. to about 80° C., about 25° C. to about 70° C., about 30° C. to about 60° C., about 35° C. to about 50° C., or about 40° C. to about 45° C. In some embodiments, the nozzle has a temperature of about 45° C. during jetting.

In some embodiments, the adhesive composition is jetted in a dot form or in a continuous stream of material on a first textile. In some embodiments, the adhesive composition is jetted as dots. In some embodiments, the jetted dots have a weight of about 50 μg to about 1000 μg, about 100 μg to about 900 μg, about 150 μg to about 800 μg, about 200 μg to about 700 μg, about 250 μg to about 600 μg, or about 300 μg to about 500 μg. In some aspects, the jetted dots have a weight of about 1000 μg, about 600 μg, or about 200 μg. The dots of adhesive composition may be about 0.5 mm to about 2.5 mm or about 1 mm to about 2 mm diameter in size. In some embodiments, the jetted dots are separated by a space of about 0.5 mm to about 3.5 mm or about 1 mm to about 3 mm. In some embodiments, the jetted dots do not disperse into the textile. In some embodiments, the jetted dots exhibit little dispersion into the textile.

In some embodiments, the jetted adhesive composition is dried. In some aspects, the jetted adhesive composition is dried at ambient temperature. In some embodiments, the jetted adhesive composition is dried at ambient temperature for at least 8, at least 10, at least 12, or at least 15 minutes. In certain embodiments, the jetted adhesive composition is dried at ambient temperature for at least 10 minutes. In some aspects, the jetted adhesive composition is dried under forced air. In some embodiments, the jetted adhesive composition is dried under forced air for at least 1, at least 3, at least 5, or at least 7 minutes. In some embodiments, the jetted adhesive composition is dried under forced air for at least 15, at least 30, at least 45, at least 50, or at least 55 second. In certain embodiments, the jetted adhesive composition is dried under forced air for at least 3 minutes. In certain embodiments, the jetted adhesive composition is dried under forced air for less than 1 minute. In some aspects, the jetted adhesive composition is dried under low temperatures (e.g., under 40° C.). In some embodiments, the jetted adhesive composition is dried at low temperatures for at least 5, at least 10, at least 15, or at least 20 minutes. In certain aspects, a jetted adhesive composition is dried at low temperatures when the adhesive composition includes a cross-linker, such as when premature cross-linking is to be avoided.

Once the jetted adhesive composition is dried on the first substrate, the substrates bearing the dried drops may be stored and/or shipped until the first substrate is bonded with a second substrate. In some embodiments, the first and/or second substrate is a release liner. In some embodiments, the first and/or second substrate is a textile. In some embodiments, the first substrate having the jetted adhesive composition is stored for at least 1 hour, at least 24 hours, at least 48 hours, at least 1 week, at least 1 month, or at least 1 year after the adhesive composition is jetted. In some embodiments, the first substrate having the jetted adhesive composition is shipped to a second location prior to bonding with a second substrate.

In some embodiments, a first textile having a dried adhesive composition (e.g., jetted adhesive dots) is bonded to a second textile. In some aspects, the bonding occurs by hot melt bonding. Hot melt bonding may occur by placing the first textile having the dried adhesive composition and the second textile in a heat press, such as a Geo Knight heat seal press, and applying set conditions to the heat press. For example, a temperature of 150° C. may be applied for a 20 second dwell time at 60 psi. In some embodiments, the glue line temperature (GLT) (i.e., the temperature the adhesive reaches during the bonding process) is measured using a color indicator strip between the two textiles. In certain embodiments, the hot melt conditions are adjusted based on the melting temperature of the polymers of the adhesive composition and the type of textile used to obtain a GLT that signifies hot melt has occurred. In some embodiments, the first textile bonded to the second textile exhibits a bonded strength of about 1 lb/inch to about 8 lb/inch, as measured using an Instron T-peel test.

In some embodiments, the first textile is a fabric textile. In some aspects, the first textile is a soft, flexible fabric textile (e.g., a textile having a fairly open weave). The first textile may be selected from the group consisting of: a cotton fabric, a spandex or elastane fabric, a stretch knit fabric, a polyester fabric, and a mesh fabric. In some aspects, the first textile is a blend of two or more fabrics, such as a stretch knight and elastane blend (e.g., 80%/20%, 72%/28%) or a cotton and spandex blend (95%/5%). A second textile may be bonded to the first textile. In certain embodiments, the first textile and the second textile are the same type of material. In other embodiments, the first textile and the second textile are two different materials. In some embodiments, the first textile is bonded to a plastic or aluminum substrate.

In some embodiments, an adhesive composition is jetted onto a release liner. The release liner may be a paper or a polyester (PET) film. In some aspects, the release liner has a silicone coating and a certain degree of texture, which provides a matte appearance. It is generally understood that the texture is required to provide adhesion of the dried dots to the paper, while the silicone provides the ability to release the dots after tacking. In some embodiments, a release liner having a dried adhesive composition (e.g., jetted adhesive dots) is applied to a textile substrate. The jetted adhesive dots may be tacked to the textile substrate and the release liner removed. In some aspects, a second textile is overlaid on to the textile substrate having the jetted adhesive dots and bonded (e.g., using a heat press).

In some embodiments, the adhesive composition comprises an aqueous polymer dispersion, a polymer powder, a dispersing agent, and a thickener. In some aspects, an aqueous polymer dispersion is a single polymer dispersion. In other aspects, an aqueous polymer dispersion is a blend of two or more aqueous polymer dispersions. In some aspects, the aqueous polymer dispersion acts as a dispersant. The aqueous polymer dispersion is a single aqueous polymer dispersion, or a blend of two or more aqueous polymer dispersions, which is capable of stabilizing a dispersion of a polymeric powder in water. In certain aspects, the aqueous polymer dispersion is selected from the group consisting of aqueous polyurethane-urea anionomers (also referred to herein as polyurethane dispersions or PUDs), aqueous acrylic emulsions, aqueous styrene acrylic emulsions, aqueous acrylic vinyl acetate emulsions, aqueous epoxy dispersions, aqueous polyamide dispersions, aqueous polyester dispersions (e.g., alkyds), and combinations thereof. As used herein, "acrylic" covers copolymers of any acrylic or methacrylic monomer, such as methyl methacrylate, n-butyl acrylate, ethyl hexyl acrylate, n-butyl methacrylate, acrylic acid, methacrylic acid, and the like.

In some embodiments, the aqueous polymer dispersion is an aqueous polyurethane dispersion or an aqueous acrylic emulsion. In some embodiments, the aqueous polymer dispersion is an aqueous polyurethane dispersion (e.g., an aliphatic polyester polyurethane). In some embodiments, the aqueous polymer dispersion is a blend of at least two polyurethane dispersions (e.g., a low molecular weight polyurethane dispersion (i.e., less than about 30,000 molecular weight) and a high molecular weight polyurethane dispersion (i.e., greater than about 60,000 molecular weight)).

In some embodiments, the aqueous polymer dispersion is a blend of at least two polyurethane dispersions having a combined molecular weight of about 20,000 to about 120,000. In some embodiments, the aqueous polymer dispersion is a blend of a polyurethane dispersion and an aqueous acrylic emulsion. Non-limiting examples of polyurethane dispersions include: NeoRez R-9621 from DSM; the Dispercoll range from Covestro, including Dispercoll U56, Dispercoll U42, Dispercoll U54, and Dispercoll XP 2682; and Sancure 20025F from Lubrizol. Non-limiting examples of acrylic emulsions or styrene acrylic emulsions include: Acronal 220na and Acronal A310S from BASF; Plextol R 123 from Synthomer; SC 6074 from StanChem Polymers; and the Carbotac products from Lubrizol, such as Carbotac 1814 acrylic emulsion. An acrylic emulsion may be selected based on its ability to provide crosslinking to the aqueous polymer dispersion. For example, Acronal 220na is an all acrylic emulsion that does not include crosslinking, while Acronal A310S is an acrylic emulsion that contains a self-crosslinking mechanism. Non-limiting examples of vinyl acetate emulsions include: polymers from AkzoNobel; polymers from Celanese; and polymers from StanChem, such as SC5019 grade vinyl acetate polymer dispersion. Non-limiting examples of aqueous epoxy dispersions include: Epi-rez water dispersed epoxy resins from Hexion, such as Epi-rez 3522-W-60. Non-limiting examples of aqueous polyamide dispersions include: polymers from Michelman, such as Michem emulsion D310. Non-limiting examples of aqueous polyester dispersions include: Eastek polymers from Eastman, such as Eastek 1000 polymer dispersion.

An aqueous polymer dispersion comprises particles dispersed in a medium (e.g., water). The particles may have a low particle size (sometimes referred to as a fine particle size) or a high particle size. In some aspects, particle size correlates with solids content. For example, an aqueous polymer dispersion comprising particles having a very low particle size may have a low solids content. Alternatively, an aqueous polymer dispersion comprising particles having a high particle size may have a higher solids content. In some aspects, the aqueous polymer dispersion has a solids content of about 10 wt % to about 50 wt %, about 15 wt % to about 45 wt %, about 20 wt % to about 40 wt %, or about 25 wt % to about 35 wt %, based on the total weight of the dispersion. In some aspects, the aqueous polymer dispersion has a solids content of about 35 wt % to about 40 wt % or about 38 wt %. In some aspects, the aqueous polymer dispersion provides about 5 wt % to about 30 wt %, about 10 wt % to about 25 wt %, or about 15 wt % to about 20 wt % of solid polymer to the adhesive composition, based on the total weight of the adhesive composition. In some embodiments, the aqueous polymer dispersion provides about 24 wt % of solid polymer to the adhesive composition. In some embodiments, the aqueous polymer dispersion provides about 8 wt % of solid polymer to the adhesive composition.

In some aspects, a polymer powder is a dispersed polymer powder. In some aspects, a polymer powder is a cryo-ground polymer powder. In some aspects, the polymer powder has a particle size of about 0 microns to about 500 microns, about 0 microns to about 400 microns, about 0 microns to about 300 microns, about 0 microns to about 250 microns, about 0 microns to about 200 microns, about 0 microns to about 150 microns, or about 0 microns to about 100 microns. In some embodiments, the polymer powder has a particle size of about 0 microns to about 170 microns or about 0 microns to about 80 microns. In some aspects, the polymer powder has a particle size that is less than 170 microns, less than 160 microns, less than 150 microns, less than 140 microns, less than 130 microns, less than 120 microns, less than 110 microns, less than 100 microns, less than 90 microns, or less than 80 microns. The particle size of the polymer powder may be determined by the nozzle size of the jetting system. For example, the maximum particle size will be ⅓ the diameter size of the nozzle.

In some embodiments, the polymer powder is selected from the group consisting of co-polyesters, polyester urethanes, polyether urethanes, ethylene vinyl acetates, co-polyamides, polyamides, polyureas, polyolefins, polycarbonate urethanes, epoxy-polyester, and combinations thereof. In some embodiments, the polymer powder is a recycled polymer powder. A polymer powder may be selected based on its adhesion ability to a specific substrate and/or its molecular weight and molecular weight distribution which can impact the ability to melt flow during bonding. In certain embodiments, the polymer powder is a polyamide. In certain embodiments, the polymer powder is a polyurethane powder. In certain embodiments, the polymer powder is a polycarbonate urethane. Non-limiting examples of polymer powders include: TPU 4529 and TPU 4073 from Fixatti; and Griltex 1A, Griltex 2A, and Griltex 9E from EMS-Griltech.

In some aspects, the polymer powder is about 0 wt % to about 45 wt %, about 10 wt % to about 40 wt %, about 15 wt % to about 35 wt %, or about 20 wt % to about 30 wt % of the adhesive composition, based on the total weight of the adhesive composition. In certain embodiments, the polymer powder is about 20 wt % of the adhesive composition. In certain embodiments, the polymer powder is about 30 wt % of the adhesive composition.

In some aspects, a dispersing agent is a surfactant and/or a polymer dispersant. In some aspects, a dispersing agent is a non-ionic surfactant (e.g., alkyl phenol ethoxylates (APEO) non-ionic surfactants or APEO free non-ionic surfactants), an anionic surfactant (e.g., sodium lauryl sulfate or sodium dioctyl sulfosuccinate), or a combination or hybrid of a non-ionic surfactant and an anionic surfactant (e.g., sodium lauryl ether sulfate (SLES)). In some aspects, a dispersing agent is an acrylic polymer dispersant (e.g., an acid rich acrylic polymer where the acid functional moiety is acrylic acid, methacrylic acid, or combinations of both) or a polyurethane dispersant (e.g., an acid rich polyurethane where the acid functionality is provided by, for example, dimethylol propionic acid (DMPA)). Non-limiting examples of dispersing agents include: Dowfax 3B2 from Dow; Dispex AA and Dispex CX from BASF; Metolat 355 and Metolat 388 from Munzig; Jeffsperse X3503 from Huntsman; Zetasperse 2500 from Evonik; and Altoma Carrier 10628 from Bolger & O'Hearn.

The amount of dispersing agent included in the adhesive composition is dependent on the total amount of polymer powder, as well as the particle size of the polymer powder. In addition, the amount of dispersing agent included in the adhesive composition may also be affected by the aqueous polyurethane dispersion (e.g., the amount of the dispersion included in the composition, as well as how effective the dispersion is as a dispersant). In some aspects, the dispersing agent may be about 0.1 wt % to about 2.0 wt %, about 0.5 wt % to about 1.5 wt %, or about 0.8 wt % to about 1.2 wt % of the adhesive composition, based on the total weight of the adhesive composition. In some aspects, the dispersing agent is about 1.1 wt % of the adhesive composition.

In some embodiments, a thickener is a water based acrylic. A thickener may be selected from the group consisting of a hydrophobically modified ethoxylated urethane (HEUR) thickener, a hydrophobically modified alkali swellable emulsion (HASE) thickener, a hydroxyethyl cellulose (HEC) thickener, a cellulosic thickener, an inorganic thickener (e.g., bentonite clays), and combinations thereof. A thickener may be selected based on the shear range that the adhesive composition will be exposed to. For example, a resting viscosity would be a low shear, and movement through a jetting nozzle would be a high shear. Non-limiting examples of thickeners include: Altoma 1953 from Bolger & O'Hearn; Acrysol ASE-60, Acrysol DR-106, and Acrysol RM-845 from Dow; Rheovis PU 1251 from BASF; Borchi Gel ALA from Borchers GmbH; Coapur 6050 from Arkema; and Tego Rheo 8510 from Evonik.

A thickener may be added to the adhesive composition to modulate the viscosity of the adhesive composition to a viscosity within the range of about 2000 cps to about 50000 cps, about 3000 cps to about 40000 cps, about 4000 cps to about 30000 cps, about 5000 cps to about 20000 cps, about 6000 cps to about 18000 cps, about 7000 cps to about 15000 cps, or about 7000 cps to about 15000 cps. In certain embodiments, a thickener is added to the adhesive composition to modulate the viscosity of the adhesive composition to a viscosity within the range of about 8000 cps to about 12000 cps. In some embodiments, the thickener is about 0.1 wt % to about 2.0 wt %, about 0.2 wt % to about 1.5 wt %, about 0.3 wt % to about 1.0 wt %, or about 0.3 to about 0.7 wt % of the adhesive composition, based on the total weight of the adhesive composition. In certain embodiments, the thickener is about 0.5 wt % of the adhesive composition.

In some embodiments, an adhesive composition further comprises an additive, (e.g., an additive that promotes flocculation). In some aspects, an additive is a polyethyleneimine. Non-limiting examples of polyethylene imines include the Lupasol range from BASF (e.g., Lupasol FG), the Epomin range from Nippon Shokubai, polyethylene imine grades from Gobekie, and polyethylene imine grades from Wuhan Qianglon Chemical. In some embodiments, the additive is about 0 wt % to about 2 wt %, about 0 wt % to about 1 wt %, or about 0 wt % to about 0.5 wt of the adhesive composition, based on the total weight of the adhesive composition.

In some embodiments, an adhesive composition further comprises a crosslinking agent (e.g., a reactive component to allow the system to crosslink). In some aspects, the crosslinking agent is selected from the group consisting of blocked or encapsulated multi-functional isocyanate, carbodiimides, Schiffs-base crosslinkers, alkyd modified polyurethanes, aceto-acetate functional polymers combined with multi-functional polyamines, UV crosslinkers, and polyaziridines (e.g., CX100 from DSM). In some embodiments, the crosslinking agent is added to an adhesive composition immediately prior to jetting.

In some embodiments, the aqueous polymer dispersion includes a carbodiimide crosslinker. The crosslinker may act as a stabilizer when added to the aqueous polymer dispersion. For example, the crosslinker may partially compensate for the reduction in molecular weight which occurs to a polyester polyurethane in an aqueous dispersion as it ages over time. In some aspects, the amount of carbodiimide crosslinker added to the aqueous dispersion is less than 2% of the total formula (i.e., no more than 1% based on the total active solids of the aqueous dispersion). A non-limiting example of a carbodiimide crosslinker is Desmodur XP2802 from Covestro.

In some embodiments, an adhesive composition excludes (i.e., does not comprise) a crosslinking agent.

In some embodiments, an adhesive composition comprises an aqueous polymer dispersion (e.g., a polyurethane dispersion), a dispersed polymer powder (e.g., a polyamide), wherein the polymer powder has a particle size of about 0 microns to about 250 microns, a dispersing agent (e.g., a surfactant), and a thickener (e.g., a water based acrylic). In some aspects, the adhesive composition further comprises water, additives, crosslinking agents, tackifying resin dispersions (e.g., Sylvalite 9000 rosin ester tackifier, a biobased tackifier from Kraton, which can be formulated with water based systems), plasticizers (e.g., Eastek 1300 water dispersed sulfopolyester polymer dispersion from Eastman), rheology modifiers, antifoam agents (e.g., Foamaster MO 2170, a zero VOC defoamer from BASF; FoamBlast 301S from DyStar; and/or Byk 1786 from Byk), biocides (e.g., Mergal CM1.5 from Troy), pigments (e.g., carbon black or $TiO_2$ pigments), colorants (e.g., colorants from Clariant and/or BASF, such as Colanyl White R500 ($TiO_2$) from Clariant, Colanyl Black N 500-MX from Clariant, Aurasperse II W-7016 carbon black from BASF, and Colanyl Red D3GD 530 VP6154 from Clariant), curing agents, fillers (e.g., Sipernat 500LS precipitated silica from Evonik), adhesion promoters (e.g., multi-functional aziridines, such as CX100 multifunctional aziridine from DSM), and mixtures thereof.

In certain embodiments, the adhesive composition comprises an amount of polymer powder and an amount of an aqueous polymer dispersion in a ratio of about 1:0.2 to about 1:1.5, or about 1:0.3 to about 1:1.2. In certain embodiments, the adhesive composition comprises an amount of polymer powder and an amount of an aqueous polymer dispersion in a ratio of about 1:0.38. In certain embodiments, the adhesive composition comprises an amount of polymer powder and an amount of an aqueous polymer dispersion in a ratio of about 1:1.14.

In some aspects, the amount of a dispersing agent and a thickener present in the adhesive composition is dependent on the chosen solids content and/or the relative amounts of the polymer dispersion and polymer powder in the adhesive composition. In certain aspects, the adhesive composition comprises a dispersing agent at a ratio of 1:0.06 to the polymer powder. In some aspects, the adhesive composition comprises about 0.5 wt % to about 2 wt % dispersing agent. In certain aspects, the adhesive composition comprises about 1.2 wt % dispersing agent. In some aspects, the adhesive composition comprises 0.1 wt % to about 2 wt % of a thickener. In certain aspects, the adhesive composition comprises 0.3 wt % to about 0.7 wt %.

In some embodiments, the adhesive composition has a solids content of about 5 wt % to about 55 wt %, about 10 wt % to about 40 wt %, about 15 wt % to about 30 wt %, or about 15 wt % to about 20 wt %. In certain embodiments, the adhesive composition has a solids content sufficient to allow the jetted adhesive composition to be deposited onto a textile and not be absorbed into the textile.

The adhesive composition described herein may be prepared by mixing all of the liquid components (e.g., the aqueous polymer dispersion and a dispersing agent) and then adding the polymer powder. After the polymer powder has been mixed into the dispersion, the thickener may be added as needed to achieve the desired viscosity of the adhesive composition.

In some embodiments, the adhesive composition is prepared by adding one or more liquid components to a mixing vessel, wherein the one or more liquid components include an aqueous polymer dispersion, water, and a dispersing agent; mixing the liquid components in the mixing vessel at a sufficient speed to create a vortex; adding a polymer powder to the mixed liquid components to form an adhesive composition; and adding a thickener to the adhesive composition.

In some embodiments, the liquid components are mixed at a speed of about 500 rpm to about 1500 rpm, or about 800 rpm to about 1000 rpm. In certain embodiments, the liquid components are mixed at a speed of about 1000 rpm. In some aspects, the liquid components mixing speed is selected based on the size of the mixing vessel. The mixing vessel may be a 250 ml, 1 L, 5 gallon, or 55 gallon mixing vessel (e.g., a 250 ml polyethylene vessel). It is generally understood that the size of the mixing vessel may be increased as the manufacturing of the adhesive composition is scaled up.

In some embodiments, the polymer powder is added to the center of the vortex. The polymer powder may be added in an amount that is quickly dispersed into the mixed liquid components. In some aspects, the polymer powder is added slowly to the moving vortex.

In some embodiments, the thickener is added dropwise to the adhesive composition. For example, the thickener may be added at 18 drops to the adhesive composition. After adding the thickener, the adhesive composition may be mixed for about 8 minutes to about 10 minutes. In some embodiments, the viscosity of the adhesive composition is measured after the thickener is added and the adhesive composition is mixed. If the adhesive composition does not have the desired viscosity (e.g., about 8000 cps to about 12000 cps) additional thickener may be added accompanied by further mixing. This step may be repeated until the desired viscosity of the adhesive composition is reached.

The adhesive composition described herein exhibits various unique features. For example, the adhesive composition may be deposited as liquid dots on a surface (e.g., fabric) via a piezo-electric nozzle using compressed air. Typically, an adhesive composition comprising a solids content of about 28 wt %, which consists of a dispersed polymer having a particle size in the range of about 40 to about 300 nm in combination with a dispersed polymer powder within the size range of about 2 to about 250 micron in an aqueous medium, would result in coagulation/flocculation of the adhesive composition under high shear and/or drying or skinning around the nozzle of the jet. However, due to the high level of dispersant included in the adhesive composition, the expected coagulation and drying/skinning of the nozzle are inhibited. In addition, the rheology of the formulation allows for the continuous operation of the jetting nozzles and deposition of adhesive dots on a surface. The dot is able to sit on the surface of the textile without fully penetrating the fabric, thereby allowing the adhesive to be bonded at a later time.

One skilled in the art readily appreciates that the present invention is well adapted to carry out the objects and obtain the ends and advantages mentioned, as well as those inherent therein. The details of the description and the examples herein are representative of certain embodiments, are exemplary, and are not intended as limitations on the scope of the invention. Modifications therein and other uses will occur to those skilled in the art. These modifications are encompassed within the spirit of the invention. It will be readily apparent to a person skilled in the art that varying substitutions and modifications may be made to the invention disclosed herein without departing from the scope and spirit of the invention.

The articles "a" and "an" as used herein in the specification and in the claims, unless clearly indicated to the contrary, should be understood to include the plural referents. Claims or descriptions that include "or" between one or more members of a group are considered satisfied if one, more than one, or all of the group members are present in, employed in, or otherwise relevant to a given product or process unless indicated to the contrary or otherwise evident from the context. The invention includes embodiments in which exactly one member of the group is present in, employed in, or otherwise relevant to a given product or process. The invention also includes embodiments in which more than one, or all of the group members are present in, employed in, or otherwise relevant to a given product or process. Furthermore, it is to be understood that the invention provides all variations, combinations, and permutations in which one or more limitations, elements, clauses, descriptive terms, etc., from one or more of the listed claims is introduced into another claim dependent on the same base claim (or, as relevant, any other claim) unless otherwise indicated or unless it would be evident to one of ordinary skill in the art that a contradiction or inconsistency would arise. It is contemplated that all embodiments described herein are applicable to all different aspects of the invention where appropriate. It is also contemplated that any of the embodiments or aspects can be freely combined with one or more other such embodiments or aspects whenever appropriate. Where elements are presented as lists, e.g., in Markush group or similar format, it is to be understood that each subgroup of the elements is also disclosed, and any element(s) can be removed from the group. It should be understood that, in general, where the invention, or aspects of the invention, is/are referred to as comprising particular elements, features, etc., certain embodiments of the invention or aspects of the invention consist, or consist essentially of, such elements, features, etc. For purposes of simplicity those embodiments have not in every case been specifically set forth in so many words herein. It should also be understood that any embodiment or aspect of the invention can be explicitly excluded from the claims, regardless of whether the specific exclusion is recited in the specification. For example, any one or more active agents, additives, ingredients, optional agents, types of organism, disorders, subjects, or combinations thereof, can be excluded.

Where ranges are given herein, the invention includes embodiments in which the endpoints are included, embodiments in which both endpoints are excluded, and embodiments in which one endpoint is included and the other is excluded. It should be assumed that both endpoints are included unless indicated otherwise. Furthermore, it is to be understood that unless otherwise indicated or otherwise evident from the context and understanding of one of ordinary skill in the art, values that are expressed as ranges can assume any specific value or subrange within the stated ranges in different embodiments of the invention, to the tenth of the unit of the lower limit of the range, unless the context clearly dictates otherwise. It is also understood that where a series of numerical values is stated herein, the invention includes embodiments that relate analogously to any intervening value or range defined by any two values in the series, and that the lowest value may be taken as a minimum and the greatest value may be taken as a maximum. Numerical values, as used herein, include values expressed as percentages. For any embodiment of the invention in which a numerical value is prefaced by "about" or "approximately", the invention includes an embodiment in which the exact value is recited. For any embodiment of the invention in which a numerical value is not prefaced by "about" or "approximately", the invention includes an embodiment in which the value is prefaced by "about" or "approximately".

"Approximately" or "about" generally includes numbers that fall within a range of 1% or in some embodiments within a range of 5% of a number or in some embodiments within a range of 10% of a number in either direction (greater than or less than the number) unless otherwise stated or otherwise evident from the context (except where such number would impermissibly exceed 100% of a possible value). It should be understood that, unless clearly indicated to the contrary, in any methods claimed herein that include more than one act, the order of the acts of the method is not necessarily limited to the order in which the acts of the method are recited, but the invention includes embodiments in which the order is so limited. It should also be understood that unless otherwise indicated or evident from the context, any product or composition described herein may be considered "isolated".

As used herein the term "comprising" or "comprises" is used in reference to compositions, methods, and respective component(s) thereof, that are essential to the invention, yet open to the inclusion of unspecified elements, whether essential or not.

As used herein the term "consisting essentially of" refers to those elements required for a given embodiment. The term permits the presence of additional elements that do not materially affect the basic and novel or functional characteristic(s) of that embodiment of the invention.

The term "consisting of" refers to compositions, methods, and respective components thereof as described herein, which are exclusive of any element not recited in that description of the embodiment.

It is to be understood that the inventions disclosed herein are not limited in their application to the details set forth in the description or as exemplified. The invention encompasses other embodiments and is capable of being practiced or carried out in various ways. Also, it is to be understood that the phraseology and terminology employed herein is for the purpose of description and should not be regarded as limiting.

While certain compositions and methods of the present invention have been described with specificity in accordance with certain embodiments, the following examples serve only to illustrate the methods and compositions of the invention and are not intended to limit the same.

EXEMPLIFICATION

Example 1: Manufacturing Process

Jetting is performed using a Nordson EFD Piezo Actuator Pico Pulse HD controlled by the Pico Touch controller. The fluid assembly used has a 300-micron nozzle, which is where the fluid delivery system attaches. The material is traditionally supplied in a 30 cc syringe that screws into the fluid body assembly. Air pressure of about 80 psi is applied to the top of the syringe.

The jetting cycle has three stages: valve open, pulse, and valve close. These three stages together are the cycle, however these may take place faster than the set cycle time, but they may not add up to more time than the set cycle time. The set cycle time determines the frequency at which the nozzle opens and closes. A standard cycle time is about 15.00 ms. At time=0 the three stages begin. For example, the valve opens in the set open time, typically 0.3 ms, to the set stroke percentage, typically 90% (max). The valve opening is characterized by the tappet, bearing a ceramic ball tip, inside the fluid body assembly pulling back from the opening of the nozzle. This opening allows the air pressure behind the material in the syringe to begin pushing material out through the valve. Once the valve is in the open position the pulse begins, typically set at 1.5 ms, material starts to flow out of the nozzle. At the end of the pulse time the tappet is pushed to the closed position in a set amount of time typically 0.8 ms, close time, and with a set amount of power typically 120v, close volts. The combination of close time and close volts slams the valve closed and jettisons the material from inside the nozzle.

In this process the dot size and volume are controlled by air pressure, stroke percentage, open time, pulse time, and close time. Each of these affects either how much force is behind the material or how long the valve is open for.

Example 2: Adhesive Composition Formulations

Adhesive Composition I
Components:
1. NeoRez R 9621 aliphatic polyester waterborne urethane supplied by DSM (aqueous polymer dispersion); 20 g
2. Deionized water; 39.5 g
3. Altoma carrier 10628 dispersant supplied by Bolger & O'Hearn (dispersant); 20 g
4. Griltex 1A co-polyamide powder supplied by EMS-Griltech (polymer powder); 20 g
5. Altoma clear conc #1953 acrylic emulsion thickener supplied by Bolger & O'Hearn (thickener); 0.5 g Adhesive Composition II:
Components:
1. Sancure 20025F supplied by Lubrizol (aqueous polymer dispersion); 20 g
2. Deionized water; 39.5 g
3. Altoma carrier 10628 dispersant supplied by Bolger & O'Hearn (dispersant); 20 g
4. Griltex 1A co-polyamide powder supplied by EMS-Griltech (polymer powder); 20 g
5. Altoma clear conc #1953 acrylic emulsion thickener supplied by Bolger & O'Hearn (thickener); 0.5 g Adhesive Composition III:
1. Dispercoll U56 supplied by Covestro (aqueous polymer dispersion); 20 g
2. Deionized water; 39.5 g
3. Altoma carrier 10628 dispersant supplied by Bolger & O'Hearn (dispersant); 20 g
4. Griltex 1 A co-polyamide powder supplied by EMS-Griltech (polymer powder); 20 g
5. Altoma clear conc #1953 acrylic emulsion thickener supplied by Bolger & O'Hearn (thickener); 0.5 g Adhesive Composition IV
Components:
1. NeoRez R 9621 aliphatic polyester waterborne urethane supplied by DSM (aqueous polymer dispersion); 20 g
2. Deionized water; 39.5 g
3. Altoma carrier 10628 dispersant supplied by Bolger & O'Hearn (dispersant); 20 g
4. UNEX 4073 polyurethane powder supplied by Fixatti (polymer powder); 20 g
5. Altoma clear conc #1953 acrylic emulsion thickener supplied by Bolger & O'Hearn (thickener); 0.5 g Adhesive Composition V
Components:
1. NeoRez R 9621 aliphatic polyester waterborne urethane supplied by DSM (aqueous polymer dispersion); 20 g
2. Deionized water; 39.5 g
3. Altoma carrier 10628 dispersant supplied by Bolger & O'Hearn (dispersant); 20 g
4. UNEX 4529 polyurethane powder supplied by Fixatti (polymer powder); 20 g
5. Altoma clear conc #1953 acrylic emulsion thickener supplied by Bolger & O'Hearn (thickener); 0.5 g Adhesive Composition VI
Components:
1. NeoRez R 9621 aliphatic polyester waterborne urethane supplied by DSM (aqueous polymer dispersion); 20 g
2. Deionized water; 39.5 g
3. Altoma carrier 10628 dispersant supplied by Bolger & O'Hearn (dispersant); 20 g
4. TPU4126 (0-100 micron) polyurethane powder supplied by Fixatti (polymer powder); 20 g
5. Altoma clear cone #1953 acrylic emulsion thickener supplied by Bolger & O'Hearn (thickener); 0.5 g Adhesive Composition VII
Components:
1. Dispercoll U56 supplied by Covestro (aqueous polymer dispersion); 20 g
2. Deionized water; 39.5 g
3. Altoma carrier 10628 dispersant supplied by Bolger & O'Hearn (dispersant); 20 g
4. UNEX 4073 polyurethane powder supplied by Fixatti (polymer powder); 20 g
5. Altoma clear conc #1953 acrylic emulsion thickener supplied by Bolger & O'Hearn (thickener); 0.5 g Adhesive Composition VIII
Components:
1. Sancure 20025F supplied by Lubrizol (aqueous polymer dispersion); 20 g
2. Deionized water; 39.5 g
3. Altoma carrier 10628 dispersant supplied by Bolger & O'Hearn (dispersant); 20 g
4. UNEX 4073 polyurethane powder supplied by Fixatti (polymer powder); 20 g
5. Altoma clear conc #1953 acrylic emulsion thickener supplied by Bolger & O'Hearn (thickener); 0.5 g Adhesive Composition IX
Components:
1. Dispercoll U56 supplied by Covestro (aqueous polymer dispersion); 20 g
2. Deionized water; 39.5 g
3. Altoma carrier 10628 dispersant supplied by Bolger & O'Hearn (dispersant); 20 g
4. UNEX 4529 polyurethane powder supplied by Fixatti (polymer powder); 20 g
5. Altoma clear cone #1953 acrylic emulsion thickener supplied by Bolger & O'Hearn (thickener); 0.5 g Adhesive Composition X
Components:
1. Dispercoll U54 supplied by Covestro (aqueous polymer dispersion); 20 g
2. Deionized water; 39.5 g
3. Altoma carrier 10628 dispersant supplied by Bolger & O'Hearn (dispersant); 20 g
4. UNEX 4529 polyurethane powder supplied by Fixatti (polymer powder); 20 g
5. Altoma clear conc #1953 acrylic emulsion thickener supplied by Bolger & O'Hearn (thickener); 0.5 g Adhesive Composition XI
Components:
1. Dispercoll XP 2682 supplied by Covestro (aqueous polymer dispersion); 20 g
2. Deionized water; 39.5 g
3. Altoma carrier 10628 dispersant supplied by Bolger & O'Hearn (dispersant); 20 g
4. Griltex 1A co-polyamide powder supplied by EMS-Griltech (polymer powder); 20 g
5. Altoma clear conc #1953 acrylic emulsion thickener supplied by Bolger & O'Hearn (thickener); 0.5 g Adhesive Composition XII
Components:
1. Dispercoll XP 2682 supplied by Covestro (aqueous polymer dispersion); 20 g
2. Deionized water; 39.5 g
3. Altoma carrier 10628 dispersant supplied by Bolger & O'Hearn (dispersant); 20 g
4. UNEX 4073 polyurethane powder supplied by Fixatti (polymer powder); 20 g
5. Altoma clear cone #1953 acrylic emulsion thickener supplied by Bolger & O'Hearn (thickener); 0.5 g Adhesive Composition XIII
Components:
1. NeoRez R 9621 aliphatic polyester waterborne urethane supplied by DSM (aqueous polymer dispersion); 20 g
2. Deionized water; 39.5 g
3. Altoma carrier 10628 dispersant supplied by Bolger & O'Hearn (dispersant); 20 g
4. TPU6511B (0-100 micron) polyurethane powder supplied by Fixatti (polymer powder); 20 g
5. Altoma clear conc #1953 acrylic emulsion thickener supplied by Bolger & O'Hearn (thickener); 0.5 g Adhesive Composition XIV
Components:
1. Dispercoll XP 2682 and Dispercoll U56 (50%/50%) supplied by Covestro (aqueous polymer dispersion); 20 g
2. Deionized water; 39.5 g
3. Altoma carrier 10628 dispersant supplied by Bolger & O'Hearn (dispersant); 20 g
4. Griltex 1A co-polyamide powder supplied by EMS-Griltech (polymer powder); 20 g
5. Altoma clear conc #1953 acrylic emulsion thickener supplied by Bolger & O'Hearn (thickener); 0.5 g Adhesive Composition XV
Components:
1. Dispercoll XP 2682 supplied by Covestro and Sancure 20025F supplied by Lubrizol (50%/50%) (aqueous polymer dispersion); 20 g
2. Deionized water; 39.5 g
3. Altoma carrier 10628 dispersant supplied by Bolger & O'Hearn (dispersant); 20 g
4. Griltex 1A co-polyamide powder supplied by EMS-Griltech (polymer powder); 20 g
5. Altoma clear cone #1953 acrylic emulsion thickener supplied by Bolger & O'Hearn (thickener); 0.5 g Adhesive Composition XVI
Components:
1. Dispercoll U56 supplied by Covestro and Acronal A310S supplied by BASF (50%/50%) (aqueous polymer dispersion); 20 g
2. Deionized water; 39.5 g 3. Altoma carrier 10628 dispersant supplied by Bolger & O'Hearn (dispersant); 20 g
4. Griltex 1A co-polyamide powder supplied by EMS-Griltech (polymer powder); 20 g
5. Altoma clear conc #1953 acrylic emulsion thickener supplied by Bolger & O'Hearn (thickener); 0.5 g Procedure to Prepare the Adhesive Compositions:

Weigh liquid components 1, 2 & 3 into a 250 ml polyethylene vessel and secure the vessel under a mixer inside a fumehood. Lower the saw tooth agitator blade on the mixer until it is just under the liquid surface and start the agitator at 1000 rpm so as to create a smooth vortex. Pre-weigh the powder (component 4) into a separate 250 ml container. Add the powder to the moving vortex of components 1, 2 & 3 slowly. Add a portion of the thickener (component 5) last, slowly into the moving vortex, dropwise. Mix at 1000 rpm for 10 mins. Stop the mixer and remove the sample vessel to allow measurement of the viscosity before all of the thickener has been added so as not to over shoot the desired final viscosity. Add further thickener with mixing as required.

Example 3: Adhesive Bond Strength Testing by Instron T-Peel Test

Material Preparation:

Different adhesive formulations (as identified in Example 2) are jetted as dots onto a first textile fabric and air dried (ambient conditions) for a period of at least 15 minutes. The first textile fabric was then bonded to a second textile fabric of the same type and orientation. The bonding of the textile fabrics occurred using a Geo Knight heat seal press (model KD20SP). The set conditions for the heat seal press were 150° C./20 second dwell time/60 psi. The glue line temperature (GLT) was measured at 135° C. Thermolabel temperature sensitive tapes from Paper Thermometer Co. (set number 4) were used.

Instron T-Peel Test:

Bond strengths of various adhesive formulations are measured using an Instron 5544, load cell 500N, pursuant to ASTM D1876-01 Standard Method for Peel Resistance of Adhesives (T-peel test). The bond strength data was given 24 hours after the bond was made, and a second set of samples was tested after 24 hours, as well as a 10x wash cycle at 60° C., dry cycle also at 60° C. using a Miele professional PW 6065 Plus washer & a standard household dryer (Kenmore).

Testing Protocol:
1. Cut out three test pieces from the bonded textile sample, each 25 mm (1 inch) wide and 200 mm (8") long.
2. Mount the first test piece centrally with the un-bonded ends secured centrally in the machine clamps with tension applied evenly across the width.
3. Operate the tensile tester until 150 mm (6 inches) extension is reached then interrupt the test. Record the average of peaks and max force achieved in lb/inch (or N/mm).
4. Repeat for test pieces 2 and 3.
5. When peel strength values have been determined for all three test pieces, calculate the overall max and peak values for the three test pieces.

Results:

Bond strength testing results for different adhesive compositions (identified by relevant number from Example 2) are provided in the table below. In addition, bond strength testing results are provided for three solid films for comparison (SewFree 3415, SewFree 3412, and SewFree BFF3001 supplied by Bemis Associates). Testing results were obtained before washing the bonded textile (BW) and after washing the bonded textile (AW) (10 cycles 60° C./low heat dry). The solid films were all tested before wash.

| Composition # | stretch knit PA/Elastan (80/20%) 120 gsm | | Cotton/Spandex (95%/5%) knit 220 gsm | | stretch knit PA/Elastan (72/28%) 170 gsm | | 3Layer fourway-stretch polyester knit 245 gsm | |
|---|---|---|---|---|---|---|---|---|
| | BW Dots | AW Dots | BW Dots | AW Dots | BW Dots | AW Dots | BW Dots | AW Dots |
| #1 | 3.22 | 1.60 | 2.93 | 1.72 | 3.22 | 2.61 | 8.31 | 6.59 |
| #2 | 3.75 | 4.00 | 4.38 | 4.05 | 4.73 | 4.11 | 2.59 | 2.53 |
| #3 | 5.32 | 3.56 | 6.48 | 3.46 | 6.34 | 4.26 | 6.52 | 4.27 |
| #4 | 5.15 | 3.40 | 6.17 | 4.93 | 5.07 | 4.77 | 8.29 | 6.88 |
| #5 | 3.00 | 0.00 | 1.17 | 0.00 | 2.06 | 0.00 | 7.56 | 7.42 |
| #6 | 2.04 | 0.00 | 0.41 | 0.00 | 1.26 | 0.00 | 4.01 | 0.00 |
| #7 | 4.58 | 4.15 | 7.47 | 4.40 | 6.02 | 5.10 | 8.71 | 5.41 |
| #8 | 3.76 | 3.62 | 4.80 | 3.90 | 4.64 | 3.40 | 3.17 | 3.61 |
| #9 | 4.76 | 3.00 | 8.02 | 3.05 | 5.70 | 3.25 | 8.75 | 4.45 |
| #10 | 5.48 | 2.25 | 3.51 | 0.00 | 2.07 | 0.00 | 8.13 | 6.05 |
| #11 | 3.78 | 2.38 | 5.08 | 2.33 | 3.01 | 1.52 | 3.05 | 1.86 |
| #12 | 4.75 | 3.27 | 6.60 | 2.44 | 5.48 | 0.00 | 4.70 | 0.00 |
| #13 | 4.01 | 2.63 | 5.32 | 4.50 | 5.15 | 3.44 | 4.97 | 4.51 |
| #14 | 3.39 | 1.01 | 4.16 | 2.82 | 2.67 | 0.00 | 3.95 | 1.95 |
| #15 | 2.51 | 1.39 | 1.47 | 0.59 | 2.53 | 1.58 | 1.61 | 0.79 |
| #16 | 1.98 | 1.27 | 6.49 | 3.80 | 4.52 | 2.96 | 4.60 | 2.32 |

| | stretch knit PA/Elastan (80/20%) 120 gsm | Cotton/ Spandex (95%/5%) knit 220 gsm | stretch knit PA/Elastan (72/28%) 170 gsm | 3Layer fourway-stretch polyester knit 245 gsm |
|---|---|---|---|---|
| Solid films: | Film | Film | Film | Film |
| 3415 3 mil | 5.83 | 4.38 | 4.35 | 11.43 |
| 3412 2 mil | 2.88 | 1.73 | 1.33 | 7.07 |
| BFF3001 | 2.61 | 1.13 | 1.15 | 9.96 |

What is claimed is:
1. A method of bonding a textile comprising:
   a. jetting an adhesive composition comprising a crosslinking agent onto a first textile;
   b. drying the jetted adhesive composition on the first textile; and
   c. bonding the first textile to a second textile.

2. The method of claim 1, wherein the adhesive composition is jetted through a nozzle, wherein the nozzle is heated to a temperature between 45° C. and 55° C.

3. The method of claim 1, wherein the jetting of the adhesive composition comprises a jetting cycle.

4. The method of claim 3, wherein the jetting cycle comprises a valve open stage, a pulse stage, and a valve close stage.

5. The method of claim 4, wherein the valve open stage occurs for a period of about 0.25 ms to about 0.3 ms;
wherein the pulse stage occurs for a period of about 0.7 ms to about 1.5 ms; or
wherein the valve close stage occurs for about a period of about 0.15 to about 0.8 ms.

6. The method of claim 3, wherein the jetting cycle comprises applying pressure to a fluid delivery device to expel the adhesive composition.

7. The method of claim 6, wherein the pressure is air pressure of about 80 psi.

8. The method of claim 1, wherein the jetted adhesive composition is dried at ambient temperature or dried using force drying.

9. The method of claim 1, wherein the first textile and/or second textile is a fabric textile.

10. The method of claim 1, wherein the first textile is a blend of two or more fabrics.

11. The method of claim 1, wherein the first textile and the second textile are the same material.

12. The method of claim 1, wherein the first textile and the second textile are bonded using a hot melt adhesive bonding.

13. The method of claim 1, wherein the adhesive composition is jetted on the first textile as one or more jetted dots.

14. The method of claim 13, wherein the one or more jetted dots of adhesive composition has a diameter of 0.5 mm to 5 mm.

15. The method of claim 1, wherein the crosslinking agent is selected from the group consisting of blocked or encapsulated multi-functional isocyanate, carbodiimides, Schiffs-base crosslinkers, alkyd modified polyurethanes, aceto-acetate functional polymers combined with multi-functional polyamines, UV crosslinkers, and polyaziridines.

16. The method of claim 1, wherein the crosslinking agent comprises multi-functional isocyanate.

17. The method of claim 1, wherein the adhesive composition further comprises
an aqueous polymer dispersion;
a dispersing agent; and
a thickener.

18. The method of claim 1, wherein the adhesive composition is produced by a method comprising:
a. adding one or more liquid components to a mixing vessel, wherein the one or more liquid components include an aqueous polymer dispersion, water, a dispersing agent, and the crosslinking agent;
b. mixing the liquid components in the mixing vessel at a sufficient speed to create a vortex; and
c. adding a thickener to the adhesive composition.

19. A method of bonding a textile comprising:
a. manufacturing an adhesive composition comprising:
i. adding one or more liquid components to a mixing vessel, wherein the one or more liquid components include an aqueous polymer dispersion, water, a dispersing agent, and the crosslinking agent;
ii. mixing the liquid components in the mixing vessel at a sufficient speed to create a vortex; and
iii. adding a thickener to the adhesive composition;
b. jetting the manufactured adhesive composition onto a first textile;
c. drying the jetted adhesive composition on the first textile; and
d. bonding the first textile to a second textile.

* * * * *